INVENTOR.
E. K. CLARDY

BY Young & Quigg
ATTORNEYS

Sept. 23, 1969   E. K. CLARDY   3,468,156
METHOD AND APPARATUS FOR CHROMATOGRAPHIC ANALYSIS OF A
BINARY MIXTURE WITHOUT PEAK SEPARATION
Filed Nov. 17, 1966   3 Sheets-Sheet 2

INVENTOR.
E. K. CLARDY
BY Young & Quigg
ATTORNEYS

INVENTOR.
E. K. CLARDY

United States Patent Office 3,468,156
Patented Sept. 23, 1969

3,468,156
METHOD AND APPARATUS FOR CHROMATOGRAPHIC ANALYSIS OF A BINARY MIXTURE WITHOUT PEAK SEPARATION
Edwin K. Clardy, Bartlesville, Okla., assignor to Phillips Petroleum Company, a corporation of Delaware
Filed Nov. 17, 1966, Ser. No. 595,178
Int. Cl. G01n *31/08*
U.S. Cl. 73—23.1                    7 Claims

ABSTRACT OF THE DISCLOSURE

In order to analyze binary gases rapidly without separation of the chromatographic peaks or to accurately analyze a pair of inseparable chromatographic peaks, the characteristic analyzer response, as determined by experimental analysis using samples of known composition, is used to determine the composition of an unknown sample.

---

This invention relates to a method and apparatus for chromatographic analysis.

Chromatographic analysis has assumed a position of prominence in the processing industries in recent years. Chromatographic analyzers are instruments used for the detection of the gaseous components of a binary gaseous mixture. Typically, the gaseous sample is introduced into one end of the chromatographic column and the components are separated by virtue of the difference in time necessary for the components to move through the chromatographic column. As the components move through the column, the species present and exiting from the chromatographic column form a Gaussian-type curve when the quantity of exiting material is graphically plotted against time. Stated another way, initially only a small amount of a particular species will exit from the column. Subsequently, a greater quantity of material will exit and so on until a peak is reached. The quantity of material exiting from the column will then decrease and subsequently all of the particular species will pass through. It is in this manner that the Gaussian-type curve is formed when the quantity of material exiting from the column is plotted against time.

Since the chromatographic analyzer is capable of detecting only the amounts, but not the species, of material exiting from the column, it is essential only one species be allowed to exit from the column at a time. In view of the Gaussian distribution phenomenon previously explained, the column must be of sufficient length so that sufficient time is allowed for the entire Gaussian distribution for a particular species to exit from the column prior to the next Gaussian distribution exiting from the column. If these Gaussian distributions are not given sufficient time to completely separate, the analyzer response will indicate, not the quantity of one particular species, but the quantity of several species. This obviously gives erroneous results.

As a result of the difference in flow rate of each particular species through the column, it has been necessary to provide a column of sufficient length to completely separate the various Gaussian type curves formed by each gaseous species of the mixture. As a consequence of providing sufficient length to distinctly separate the Gaussian type curves formed by the analyzer's response for each component of the mixture, the time required for measurement increases proportionately. My method and apparatus provide an invention which results in a substantially decreased analysis time. My invention permits the substantial decrease in the analysis time by providing a method and apparatus to obtain instructive results from a chromatographic analyzer when the analyzer response represents the summation of quantities of both species of a binary gaseous sample. In other words, my invention allows an analyzer output, which heretofore represented unsatisfactory operation due to the lack of separation of Gaussian distributions, to be fully instructive of the percentage of each component present. Stated with reference to a graphical analogy, my invention allows an analyzer response, representing the summation of the Gaussian distribution curves, to be instructive of the percentage of each component in the sample.

In summary, one embodiment of my invention provides a method and apparatus whereby an analyzer response can be used to determine the percentage composition of a binary mixture of gases wherein the sample, consisting of two components, can be introduced into a chromatographic column sufficiently short so that the components are not traveling through the column for a sufficient length of time for the Gaussian distribution curves to become distinctly separated for each of the two species. In so doing, the sampling time can be significantly shortened.

My invention accomplishes this remarkable advantage by correlating a chromatographic analyzer response which in reality represents the algebraic summation of the overlapping Gaussian curves for each of the two components with data taken from previous runs for the identical two components at various compositions. This correlation is effected by fitting the metered data from the sample under investigation to an equation derived by curve fitting data taken from previous runs for the identical two components at various compositions.

Accordingly, an object of my invention is to provide a method and apparatus for decreasing the time required for chromatographic analysis by allowing a shorter chromatographic column to be employed.

Another object of my invention is to provide a method and apparatus wherein a more economical chromatographic analyzer can be utilized due to the shorter column length.

Another object of my invention is to provide a method and apparatus wherein a single analyzer response representing the sum of two individual components can be correlated according to an equation derived from curve fitting data taken from calibration runs.

Other objects, advantages, and features of my invention will be readily apparent to those skilled in the art from the following description, drawing, and appended claims.

A preferred embodiment of the invention is shown in the accompanying drawings in which.

Figure 2:
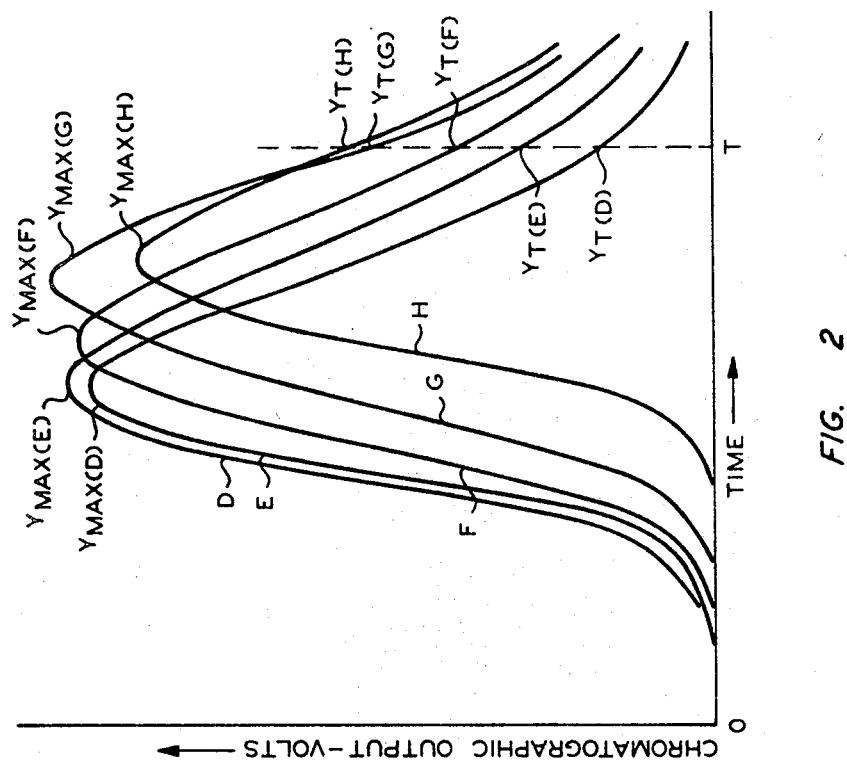
FIGURE 2 is a graph showing a typical family of calibration data curves used in practicing the invention.

The following comments are directed to the detailed operation of one embodiment of my invention. As mentioned earlier, the analyzer response from a chromatographic analyzer represents the gaseous components exiting from the chromatographic column. In view of this, when the column is of sufficiently short character so as to provide for an insufficient separation of the Gaussian distribution of the gaseous components as they proceed through the column, the analyzer response must be processed according to the instant invention to provide an instructive result. According to my invention, the first step is to select an analyzer to be calibrated. The analyzer can comprise any analyzer particularly convenient for the needs of the user; specifically, an analyzer which provides a voltage output is satisfactory. Particularly, the Perkin Elmer Model 226 chromatographic analyzer is applicable. According to the method of my invention, an advantage can be achieved in that the chromatographic column associated with the selected analyzer can be such that incomplete separation of the gaseous component Gaussian distribution curves is effected. After selection of the particular analyzer to be calibrated, mixtures comprising various ratios of the two components are tested with the analyzer. Initially, a sample comprising almost 100 percent of a first component and only trace quantities of a second component is metered and the results graphically represented by plotting, as in curve H of FIGURE 2, the quantity of sample sensed on the ordinate and elapsed time since the sample was introduced into the column on the abscissa. Additionally, a sample comprising only trace quantities of a first component and almost 100 percent of a second component is metered and the results graphically represented, as in curve D of FIGURE 2, in an identical manner on the same set of axes. Further, intermediate runs are made and the results graphically represented in an identical manner on the same set of axes, as aforementioned. As many intermediate runs can be made as are necessary to accurately portray the additional family of curves representing all intermediate mixtures. Specifically, three intermediate runs were used in one embodiment of the invention, wherein the runs represented 25 percent of a first component and 75 percent of a second component, as in curve E of FIGURE 2; 50 percent of each component, as in curve F of FIGURE 2; and 75 percent of a first component and 25 percent of a second component, as in curve G of FIGURE 2. After the family of curves, curves D, E, F, G, and H of FIGURE 2, for example, representing the particular components that are to be sampled with the particularly calibrated analyzer, are prepared according to the previously described method, they are re-plotted as normalized curves, $D_N$, $E_N$, $F_N$, $G_N$, and $H_N$ of FIGURE 3, according to statistical methods well known in the art.

Figure 3:
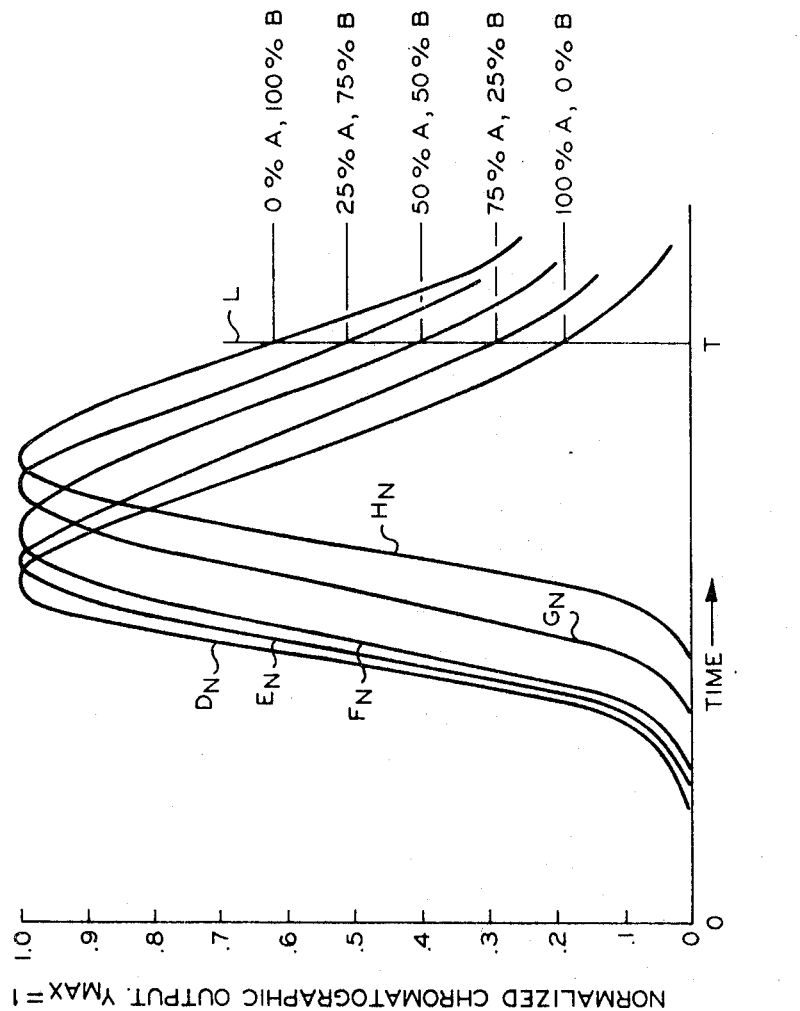
FIGURE 3 is a graph showing the normalized data curves derived from the curves of FIGURE 2 and the relationship between said normalized curves at a specific time.

Next, the negative slopes of the family of normalized curves are subjected to examination. The examination proceeds by drawing a vertical line, L, as shown by FIGURE 3, parallel to the ordinate of the axes used to prepare the family of curves previously described. This line represents an arbitrarily defined time T, but must be selected so that it falls through the relatively linear negative portions of the Gaussian distribution curves represented for each calibration sample run. If it is impossible to draw a vertical line through the normalized curves intersecting the relatively linear negative portions of the Gaussian distribution curves for each calibration sample run, the column must be shortened such that it is possible to draw a vertical line through the linear negative portions of the Gaussian distribution curves for each calibration sample run. The shortening of the column produces less separation and, hence, the family of curves are closer together. The vertical line, representing a specific elapsed time after the sample is introduced into the analyzer, must be arbitrarily selected so that, in addition to being in the linear negative portions of each of the family of curves, the ordinate at the selected time for the curve representing the particular sample being tested can be divided into the maximum ordinate of the curve representing the sample being tested; the result of the division being reflective of the percentage purity of the components. Stated in another way the larger quantity, representing the ordinate, is then divided into the smaller quantity, representing the ordinate of the particular sample being tested at the arbitrarily selected and predetermined time.

If the time has been properly although arbitrarily selected, any such division for any sample operated upon according to the above method will produce a linear relationship with respect to all other conditions of component composition. This linear relationship is, of course, reflected by the fact that the ordinates for the calibrated runs must in themselves bear a linear relationship among one another at the arbitrarily selected time. If a linear relationship between the percentage of the components in each calibration run and the ordinate in each calibration run, when subtracted from the lowest calibration run at the arbitrarily selected time, does not bear a linear relationship to the other ordinates representing calibration runs of known purity, a new arbitrary time must be selected. If no such linear relationship is achieved by the selection of a new arbitrary time, then a third arbitrary time must be chosen, and so on until a time is arbitrarily selected which provides a satisfactory linear ratio among the ordinates of the curve representing the calibration samples. The linear relationship of the curves of FIGURES 2 and 3 at time T is shown by the graph of FIGURE 4.

Figure 4:
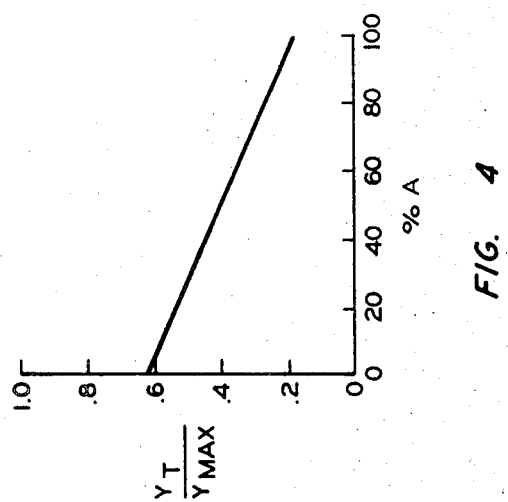
FIGURE 4 is a graph showing the relationship between the percentage composition of samples analyzed and the normalized ordinate of the sample curves at a selected point in time.

After the arbitrarily selected time has been determined, the data representing the sample composition at time T of the family of curves as shown in FIGURE 4 is curve fitted to determine its approximate mathematical formula. The data can be curve fitted to any equation suitable for curve fitting data; specifically, the equation $y = a + bx$ is satisfactory for this purpose. Applied to the instant invention, the equation can be expressed as follows:

$$\text{percent } A = K_1 + K_2 \left( \frac{Y_T}{Y_{MAX}} \right)$$

In the above equation, $K_1$ represents a first constant to be determined by curve fitting calibration data; $K_2$ represents a second constant to be determined by curve fitting calibration data; $Y_T$ represents the ordinate of the sample being tested at the selected and predetermined time; and $Y_{MAX}$ represents the maximum ordinate of the sample being tested. The data can be curve fitted to the above equation by any method that is of particular convenience to the user; specifically, the curve fitting function can be performed by analytical or empirical means. Empirically, the data can be displayed graphically and a line, representing the optical curve fitting, can be constructed and the constants $K_1$ and $K_2$ determined by methods well known in the art. Analytically, the curve fitting function can be by mathematical means, such as that of averaging data or the method of least squares. These methods are well known in the art and are demonstrated in Nomography and Empirical Equations, Dale S. Davis, 2nd Edition, 1962. In one embodiment, the method of least squares proved entirely satisfactory. Since a relationship has been derived by curve fitting data from the calibration runs, the mathematical equation whereby the percentage of the first component (or second component, by subtracting the first component percentage from 100 percent) can be calculated by merely determining the result of dividing the maximum ordinate into the ordinate at the predetermined and selected time.

This determination of the percentage of the components represented by the samples being tested can, of course, be done manually by observing a maximum ordinate during the sampling procedure, observing an ordinate at a particularly selected time, performing the proper division, and thereupon multiplying the result of the division by $K_2$ and adding $K_1$. This function can be performed automatically by any variety of means capable of providing the proper mathematical manipulation. Simple circuits, analog or digital computation means are entirely satisfactory.

Figure 1:
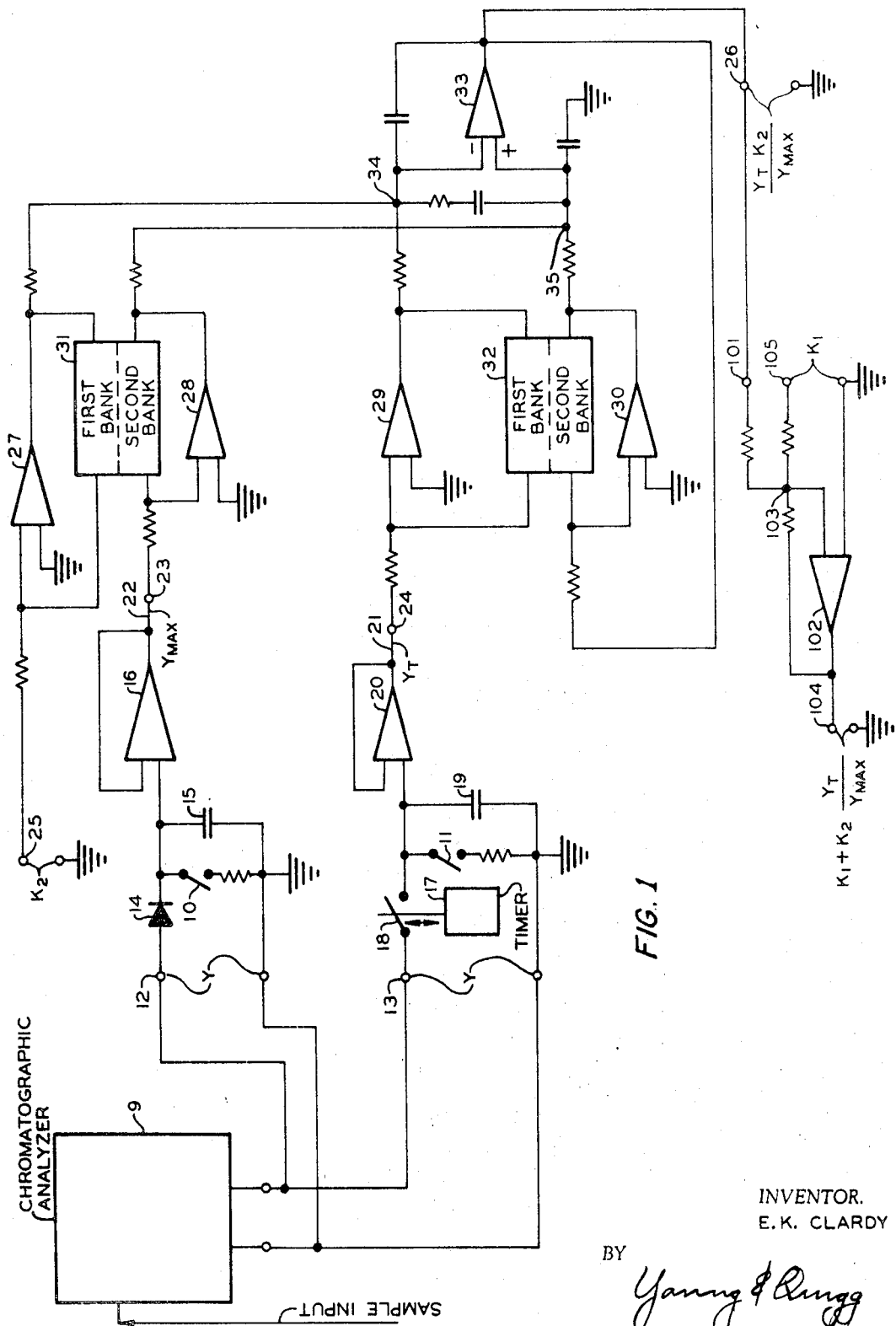
FIGURE 1 is an electrical circuit used to practice the invention.

In one embodiment, an electrical apparatus employing a voltage analogy was satisfactory. Specifically, the apparatus comprises two peak follower circuits, a multiplier/divider circuit, and an addition circuit. The peak follower circuits can be similar to those disclosed on page 70 of the Handbook of Operational Amplifier Application (1st Edition, 2nd printing) by Burr-Brown Research Corporation, Tucson, Ariz. Virtually any multiplier/divider circuit capable of generating an $e_1e_2/e_3$ readout will function quite satisfactorily in my invention. Specifically, a satisfactory circuit is the Implicit Solution Multiplier/Divider disclosed in the publication numbered PB–005a–7/64, Nexus Research Laboratory, Inc., concerning application of Type LGR–6 Logarithmic Modules. Any addition circuit capable of performing the necessary addition function is satisfactory for use in this invention. Specifically, a type of addition circuit that is satisfactory is one that employs an operational amplifier to accept a summed signal from a node to which the amplifier feedback has been connected. With reference to the attached FIGURE 1, there is indicated an electrical apparatus comprising this embodiment of the invention.

This invention can be used to determine the percentage of one component of any binary mixture of gases capable of being metered with any particular chromatograph. Obviously, the percentage of the other component can be determined by subtracting the percentage of the first component from 100 percent.

With particular reference to the attached figure, there are indicated first and second peak follower circuits, the first of which incorporates a timer. The peak follower circuits in both instances comprise a feedback operational amplifier with the nonfeedback amplifier input grounded through a capacitor. Additionally, both peak follower circuits have a resistor and switch parallel with the aforementioned capacitor. Further, the first peak follower circuit incorporates a timing switch mechanism in its input, while the second peak follower circuit incorporates a diode in its input circuit. During the operation of the peak follower circuits, switches 10 and 11 are open. A voltage output, Y, from chromatographic analyzer 9, is impressed across input terminals 12 and 13. As the response from the chromatographic analyzer enters the second peak follower circuit, the voltage flows through diode 14 and charges capacitor 15. Since operational amplifier 16 maintains a constant potential across the input and feedback leads, and hence, against output because of the feedback feature, the maximum voltage sensed is held by the second peak follower circuit in capacitor 15. Obviously, the maximum voltage held by the second peak follower circuit will represent the maximum ordinate of the Gaussian curve representing the chromatographic output. This maximum voltage has heretofore been noted in the application, and will be further noted, as $Y_{MAX}$. With respect to the operation of the first peak follower circuit, the identical input signal as was employed upon input terminal 12 is impressed upon input terminal 13. Initially, and until the selected and predetermined time is reached, timing means 17 fails to allow voltage to be impressed throughout the first peak follower circuit by maintaining switch 18 in the open position. At a selected and predetermined time timing means 17 momentarily closes switch 18. Since switch 11 was previously open, capacitor 19 is charged against reference potential immediately due to operational amplifier means 20, operating in precisely the same manner as was described with respect to the second peak follower circuit. The time at which timing means 17 momentarily closes switch 18 is an arbitrarily selected and predetermined time. The selection of this time has been previously described, and has been noted and will be noted throughout this application as time T. Since the arbitrarily selected and predetermined time, T, was selected in the negative slope portions of the Gaussian distribution curves, the first peak follower circuit will record and hold the initial voltage at the arbitrarily selected and predetermined time. The output of the first peak follower circuit representing the chromatographic voltage output at the selected time, known as $Y_T$, is removed from the first peak follower circuit via means 21. The maximum chromatographic voltage output recorded by the second peak follower circuit, known, as $Y_{MAX}$, is removed from the second peak follower circuit via means 22. $Y_{MAX}$ and $Y_T$ are then impressed into a multiplier/divider circuit via leads 23 and 24. There is additionally placed in the multiplier/divider circuit, via lead 25, a constant, $K_2$, repesenting the aforementioned $K_2$ of the equation percent $A = K_1 + K_2 (Y_T/Y_{MAX})$. This $K_2$ is a specific representation of the more general $b$ in the equation $y = a + bx$ and is in the form of a voltage impressed against reference potential. The multiplier/divider circuit provides a response, noted by $e_1e_2/e_3$. In the specific embodiment being described, the $e_1$ is represented by constant voltage $K_2$ impressed into the multiplier/divider circuit against the reference potential at lead 25. The $e_2$ is represented by the term $Y_T$, impressed into the multiplier/divider circuit at lead 24. The $e_3$ is represented by the term $Y_{MAX}$, impressed into the multiplier/divider circuit at lead 23. The output of the aforementioned multiplier/divider circuit is removed through lead 26 and represents the characteristic response $e_1e_2/e_3$. In the specific embodiment being described, the output is $K_2Y_T/Y_{MAX}$. With further reference to the function of the multiplier/divider circuit, there are indicated operational amplifiers 27, 28, 29, and 30, along with logarithmic modules 31 and 32, and summation amplifier 33.

With additional reference to operational amplifier 27, the grounded input lead allows operational amplifier 27 to maintain reference potential in the other lead. Since voltage, $K_2$, is being impressed against reference potential at lead 25, potential is forced through the first bank of logarithmic module 31. Stated another way, operational amplifier 27 maintains a reference potential in parallel of the first bank of logarithmic module 31; thus forcing the potential into the first bank of logarithmic module 31.

Operational amplifier 28 operates similarly with respect to the second bank of logarithmic module 31, and operational amplifier 29 operates similarly with respect to the first bank of logarithmic module 32. Operational amplifier 30 also operates similarly with respect to the second bank of logarithmic module 32.

During the operation of the multiplier/divider circuit, the voltage, $K_2$, is transformed to its logarithmic equivalent in logarithmic module 31. Since operational amplifier 27 imparts a sign reversal as well as amplification to its input signal, the $K_2$ sign convention that was positive as against reference potential is reversed by operational amplifier 27 and the output from operational amplifier 27 is the negative logarithm of $K_2$. In a similar manner, $Y_{MAX}$ is transformed into the negative logarithm of $Y_{MAX}$, and $Y_T$ is transformed into the negative logarithm of $Y_T$. The voltages representing the negative logarithm of $K_2$ and $Y_T$ are added at node 34, and their sum introduced into summation amplifier 33 through the negative input. The voltage representing the positive logarithm of $Y_{MAX}$ flows through contact 35 and into the positive input lead of summation amplifier 33. Other resistors, capacitors, and networks (not mentioned) are for load consumption, filtering, and stabilization, and are concerned with the basic operation of the circuit. Since the negative input of summation amplifier 33 carries the summed negative logarithm of $K_2$ and $Y_T$ and since the positive input of summation amplifier 33 carries the negative logarithm of $Y_{MAX}$, the output from summation amplifier 33 will be the summation of the positive sum of the positive logarithms of $K_2$ and $Y_T$ and the negative logarithm of $Y_{MAX}$. The change in sign convention occurred due to the aforementioned characteristic of an amplifier to reverse the sign convention. The presence of amplifier 30 and the second bank of module 32 as arranged in the circuit further alters the output presented to lead 26 by forcing it to equal the antilogarithm of the added quantity. The $e_1 e_2/e_3$, or $K_2 (Y_T/Y_{MAX})$, output of the multiplier/divider circuit represents the antilogarithm of the aforementioned logarithm summation.

The multiplier/divider circuit output previously stated as $K_2\ Y_T/Y_{MAX}$, which is removed through lead 26, is then impressed into an addition circuit via lead 101; said addition circuit containing operational amplifier 102, contact 103, output lead 104, and input lead 105. During the operation of the circuit, constant $K_1$, representing the $a$ in the equation $y=a+bx$, is impressed in voltage form into the addition circuit via input lead 105. Since the circuit operates on a voltage analogy, the voltage, represented $K_2\ Y_T/Y_{MAX}$, is permitted to enter the circuit through lead 101 and the voltage, represented $K_1$ is permitted to enter through input lead 105; whereupon both voltages are added at contact 103. The function of operational amplifier 102 is such that the nongrounded lead is maintained above reference potential and carries the network signal to amplifier 102. This forces the summed voltages exiting from contact 103 to bypass operational amplifier 102 and leave the circuit via output lead 104. Thus, the voltage exiting from output lead 104, as against reference potential, represents $K_1+K_2\ (Y_T/Y_{MAX})$, which in turn represents the percentage of one component of the binary gaseous mixture sampled. It is by this method that the equation $y=a+bx$ has been analogized and the method of the invention performed automatically. Switches 10 and 11 are now closed and capacitors 15 and 19 are discharged to zero and another analysis proceeds.

My invention is thus broadly applicable to determining the percentage of one gaseous component in a binary gaseous mixture where the output from a chromatographic analyzer represents a summation of the responses for each individual component, rather than only a single component.

Various modifications of this invention can be made in view of the foregoing disclosure, drawings, and appended claims without departing from the spirit or scope thereof.

I claim:

1. Analysis apparatus comprising a chromatographic analyzer capable of accepting a binary sample to be analyzed and producing an output signal representative of the composition of said sample; first analysis means connected to said chromotographic analyzer to sense and retain the maximum value of said analyzer output signal thereby producing a first data signal representative thereof; second analysis means connected to said chromatographic analyzer to sense said analyzer output signal during a linear portion of the output response at a selected time after said maximum output has occurred thereby producing a second data signal representative of the output signal at said selected time; means to produce a first constant signal representative of a first operating parameter of said chromatographic analyzer; third analysis means connected to said first and second analysis means and said means to produce a first constant signal to multiply said second data signal by said first constant signal and to divide the resulting product by said first data signal to produce an intermediate signal; means to produce a second constant signal representative of a second operating parameter of said chromatographic analyzer; and fourth analysis means connected to said third analysis means and said means to produce a second constant signal to add said intermediate signal and said second constant signal thereby producing an output signal which is representative of the percentage composition of a component of said sample.

2. The apparatus of claim 1 wherein said chromatographic analyzer contains a column which is of such length that the analyzer response to two components under analysis is in the form of a single unseparated chromatographic peak.

3. The apparatus of claim 1 wherein:
   (a) said first analysis means comprises a first amplification means and diode means connected in parallel with a first capacitance means;
   (b) said second analysis means comprises a second amplification means connected in series with a second capacitance means, said first and second amplification means and described appended apparatus operating in parallel;
   (c) said third analysis means comprises third, fourth, fifth, sixth, and seventh amplification means operating with first and second logarithmic modules, said third and fourth amplification means operating in parallel with said first logarithmic module, said fifth and sixth amplification means operating in parallel with said second logarithmic module, and said seventh amplification means receiving the output from said third, fourth, fifth, and sixth amplification means; and
   (d) said fourth analysis means comprises an eighth amplification means.

4. The apparatus of claim 1 wherein:
   (a) said first analysis means comprises a first operational amplifier with a first input accepting a feedback signal, a second input connected to a diode and capacitor operating in parallel;
   (b) said second analysis means comprises a second operational amplifier with a first input accepting a feedback signal connected in parallel to a switch and capacitor, said switch connected to a timing means in such a manner that the switch will be engaged at a predetermined and selected time;
   (c) said third analysis means comprises a third operational amplifier operating in parallel with a first bank of a first logarithmic module, a fourth operational amplifier operating in parallel with the second bank of said first logarithmic module, a fifth operational amplifier operating in parallel with a first bank of a second logarithmic module, a sixth operational amplifier operating in parallel with the second bank of said second logarithmic module, and a seventh operational amplifier, the output of which is operably connected to the input of said sixth amplifier, operating in such a manner that the output from said third operational amplifier and aforementioned first bank of said first logarithmic module together with the output from said fifth operational amplifier and the aforementioned first bank of said second logarithmic module are impressed into said seventh operational amplifier across a first input means, and the output from said fourth operational amplifier and aforementioned second bank of said first logarithmic module together with the output from said sixth operational amplifier and the aforementioned second bank of said second logarithmic module are impressed into said seventh operational amplifier across a second input means; and
   (d) said fourth analysis means comprises an eighth operational amplifier with a first input means receiving a combination of the output from a plurality of parallel resistors and the resistorized feedback from said eighth operational amplifier.

5. A method of decreasing the time required for chromatographic analysis comprising the steps of passing a plurality of reference samples containing various known proportions of two components through a chromatographic analyzer to determine the operating parameters of said analyzer with respect to mixtures of said two components; passing a sample of said two components into said chromatographic analyzer to establish a first signal, having the shape of a single Gaussian curve, representative of the composition of the sample; establishing a second signal representative of the maximum ordinant of the Gaussian curve formed by said first signal; establishing a third signal representative of the ordinant of the Gaussian curve formed by said first signal at a selected time, said selected time being after the time that said second signal is established and said ordinate represented by said third signal being located on a linear portion of said curve; establishing a fourth signal representative of the quotient of said third signal divided by said second signal; establishing a constant fifth signal; establishing a sixth signal representative of a first operating parameter of said chromatographic analyzer representative of the product of said fourth signal and said fifth signal; establishing a constant seventh signal representative of a second operating parameter of said chromatographic analyzer; establishing an eighth signal representative of the sum of said sixth signal and said seventh signal, said eighth signal being determinative of the proportional part of the total sample represented by each component of said sample.

7. A method of chromatographic analysis comprising the steps of introducing a plurality of reference samples containing various known proportions of two components into a chromatographic analyzer; recording the peak response of said analyzer to each of said reference samples; recording the response of said analyzer to each of said reference samples at a selected time after the introduction of each said reference sample, said selected time being subsequent to said peak response and at a time when said analyzer output is relatively linear with respect to time; establishing first and second constant signals representative of the operating parameters of said chromatographic analyzer exhibited in the analysis of said reference samples; introducing an unknown sample containing undetermined amounts of said two components into said chromatographic analyzer; establishing a first analysis signal representative of the peak response of said analyzer to said unknown sample; establishing a second analysis signal representative of the response of said analyzer to said unknown sample at said selected time after the introduction of said unknown sample; establishing a first intermediate signal representative of the quotient of said second analysis signal divided by said first analysis signal; establishing a second intermediate signal representative of the product of said first constant signal and said first intermediate signal; and establishing an output signal representative of the sum of said second intermediate signal and said second constant signal, said output signal being determinative of the proportional part of said unknown sample represented by each of said two components.

References Cited

UNITED STATES PATENTS

| 3,365,931 | 1/1968 | MacRitchie et al. | 73—23.1 |
| 3,375,701 | 4/1968 | Arksey | 73—23.1 |

FOREIGN PATENTS

| 1,104,459 | 2/1968 | Great Britain. |

OTHER REFERENCES

Bartlet, J. C. et al.: "The Determination of the Areas of Resolved and Partially Resolved Chromatography Peaks," Can. J. Chem., vol. 38 (1960).

RICHARD C. QUEISSER, Primary Examiner

V. J. TOTH, Assistant Examiner

U.S. Cl. X.R.

73—1

UNITED STATES PATENT OFFICE
CERTIFICATE OF CORRECTION

Patent No. 3,468,156                                  September 23, 1969

Edwin K. Clardy

It is certified that error appears in the above identified patent and that said Letters Patent are hereby corrected as shown below:

Column 9, lines 7, 8 and 9, should read -- nal; establishi a constant fifth signal representative of a first operating parameter of said chromatographic analyzer; establishing a sixt signal representative of the --; line 18, insert the following claim:

> 6. The method of claim 5 wherein the selected time is that time at which there is an approximate linear ratio over the ranges to be sampled of the ordinate of the normalized curve representing a known percentage of a first component in a second component subtracted from the ordinate of another normalized curve representing only the second component and the ordinate of the normalized curve representing only the first component subtracted from the ordinate of the normalized curve representing only the second component. --.

Signed and sealed this 15th day of September 1970.

(SEAL)
Attest:

EDWARD M. FLETCHER, JR.                          WILLIAM E. SCHUYLER,
Attesting Officer                                     Commissioner of Paten